United States Patent
Harris

(10) Patent No.: US 7,069,315 B1
(45) Date of Patent: Jun. 27, 2006

(54) OFF-LINE WEB SURFING VIA AN AUTOMATICALLY CREATED SUPER PREFERENCE FILE

(76) Inventor: Scott C. Harris, 3329 Cerros Redondos, Rancho Santa Fe, CA (US) 92067

( * ) Notice: Subject to any disclaimer, the term of this patent is extended or adjusted under 35 U.S.C. 154(b) by 728 days.

(21) Appl. No.: 09/799,464

(22) Filed: Mar. 5, 2001

(51) Int. Cl.
*G06F 15/16* (2006.01)

(52) U.S. Cl. ...................................... 709/224; 709/203
(58) Field of Classification Search ................ 709/203, 709/224, 227, 248
See application file for complete search history.

(56) References Cited

U.S. PATENT DOCUMENTS

| | | | |
|---|---|---|---|
| 5,991,735 A * | 11/1999 | Gerace | 705/10 |
| 6,477,509 B1 * | 11/2002 | Hammons et al. | 705/27 |
| 6,493,758 B1 * | 12/2002 | McLain | 709/227 |
| 2002/0087397 A1 * | 7/2002 | Mazza | 705/14 |
| 2002/0105533 A1 * | 8/2002 | Cristo | 345/706 |
| 2002/0105544 A1 * | 8/2002 | Lipton et al. | 345/744 |
| 2003/0033405 A1 * | 2/2003 | Perdon et al. | 709/224 |

* cited by examiner

*Primary Examiner*—Frantz B. Jean

(57) ABSTRACT

A special preferences file, called herein a "super preferences file" is formed by automatically monitoring the user's actions when that user is connected to the Internet. That super preferences file can indicate information about the users actions when connected to the Internet, including the amount of time that the user has spent on said specified Internet sites. The super preferences file is then usable to obtain off-line content when the user is not connected to the Internet. In different aspects, this can be done while the user is on multiple different computers. Another aspect monitors dick stream. The super preferences file can be protected by encrypting. According to another aspect, the indication of time, in received off-line content, can be changed.

18 Claims, 3 Drawing Sheets

OFF-LINE WEB SURFING VIA AN AUTOMATICALLY CREATED SUPER PREFERENCE FILE

Many actions take place over a network extending between a server on the network and one or many clients that are attached to the network. The Internet is an example of a publicly available network of this type. A number of servers may provide information to any of a number of clients.

Many different kinds of Internet connections are available. Broadband wire link connections such as DSL and cable connections are known. Wireless connections are also known. However, these wireless connections may incur substantial connection fees.

Certain clients, however, such as PDAs, laptop computers, and others, may sometimes be run in a mode where they lack an effective connection to the Internet. In this "off-line mode", the off-line client may have no connection to the Internet, or may have some kind of limited bandwidth connection e.g. over CDMA or dial-up.

When an off-line client is in this off-line mode, its user might still want to access certain Internet content. Services such as AvantGo(Tm) may allow an off-line computer such as a PDA to be synchronized with an internet server. The off-line client receives Internet information based on previously-selected channels. The content of the channels are specially selected to minimize the amount of information that gets transferred. A user receives information about each channel that has been subscribed to.

SUMMARY

The present invention teaches automatically forming an off-line database indicative of the user's preferences.

In one aspect, a file of the user's preferences is automatically created from the user's actions when connected to the Internet in a normal on-line mode. Information for off-line internet connections are later obtained, and the user may store pseudo real-time information on the client based on the user's preferences.

In one aspect, the super preferences file may include weighting factors which are based on the way in which the user interacts with the information.

BRIEF DESCRIPTION OF THE DRAWINGS

These and other aspects will now be described in detail with reference to the accompanying drawings, wherein.

DETAILED DESCRIPTION

The present invention recognizes that a key to off-line surfing of the Internet is the formation of a sufficiently accurate preferences file. Using the example of an Internet bidding system such as eBay, if one could predict with crystal clarity what items a user might want to bid on, then a database of those items could be formed. In this hypothetical situation, that database would include everything that a user might want to bid on. That database would be perfect: the user could access that database off-line, and obtain all of the information that they wanted. Of course, the database would be out of date, but only by the amount of time between updates with the live database. For systems such as eBay, certain dynamic information such as the time to auction end could be handled as a variable, thereby keeping this up-to-date. Only the bid price would be out of date.

Using another example of an on-line merchant, however, prices generally stay more or less constant from day to day. Certain specials and last-minute price changes may actually change from moment to moment. Time-sensitive items could also be handled by variables that are tied to the clock of the off line client that is handling the off line browsing. This hypothetical database could therefore be close to perfect.

Of course, this hypothetical database will be very difficult to realize in reality.

The present system uses automatically-learned information about the user's surfing preferences to form a file which includes information about those preferences, described herein as the super preferences file. This super preferences file predicts the user's desired content based on the users past actions. The file is automatically formed, and periodically automatically updated to reflect the user's changed preferences. In addition, the file may be formed from multiple sources, which are merged together.

The contents of the file may also be kept secret using encryption techniques, to avoid compromising the user's privacy.

Figure 1:
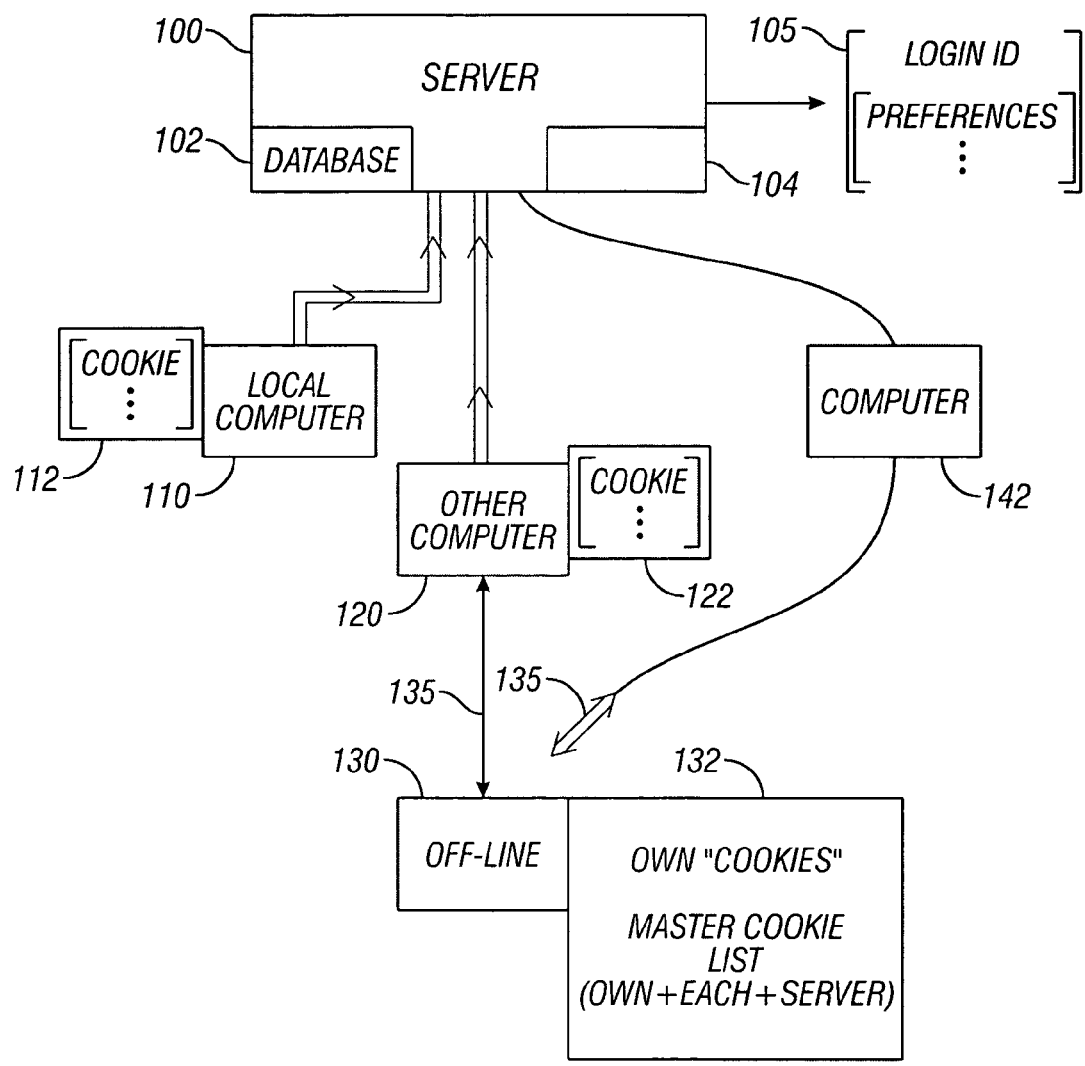
FIG. 1 shows a block diagram of a plurality of different clients connected to a server over the Internet.

The hardware forming the basic system is shown in FIG. 1. An Internet server 100 includes a database storing certain information about content to be delivered over the server, and also storing individual information in the memory 104. The individual information may include information including a login ID, and individual preferences. The server recognizes the user using standard login techniques.

As conventional, a user may access this server from one of many different portals. A local computer 110 is shown accessing the server. This local computer may be, for example, the user's home connection. Another computer 120 is shown accessing the server. This other computer may be the user's work connection. As shown, each computer includes individual information. The local computer includes information 112, and the other computer 120 includes information 122. This information can include cookies, and can also include the individually and automatically created super preferences files that are described herein. An off-line computer 130 is also shown. This off-line computer may be a PDA or laptop, for example, which is sometimes connected to the Internet over the temporary connection 140. The temporary connection 140 may be through a computer shown as 142, or may be direct. The off-line computer 130 also stores preference information shown as 132. This preference information may include the computer's own cookies, and may include a master preference list which corresponds to a combination of the preference lists 112, 122, 105, plus its own. This super preferences file is frequently updated using automatically created information. The super preferences file attempts to predict the content that a user will want to look at when off-line.

Figure 2:
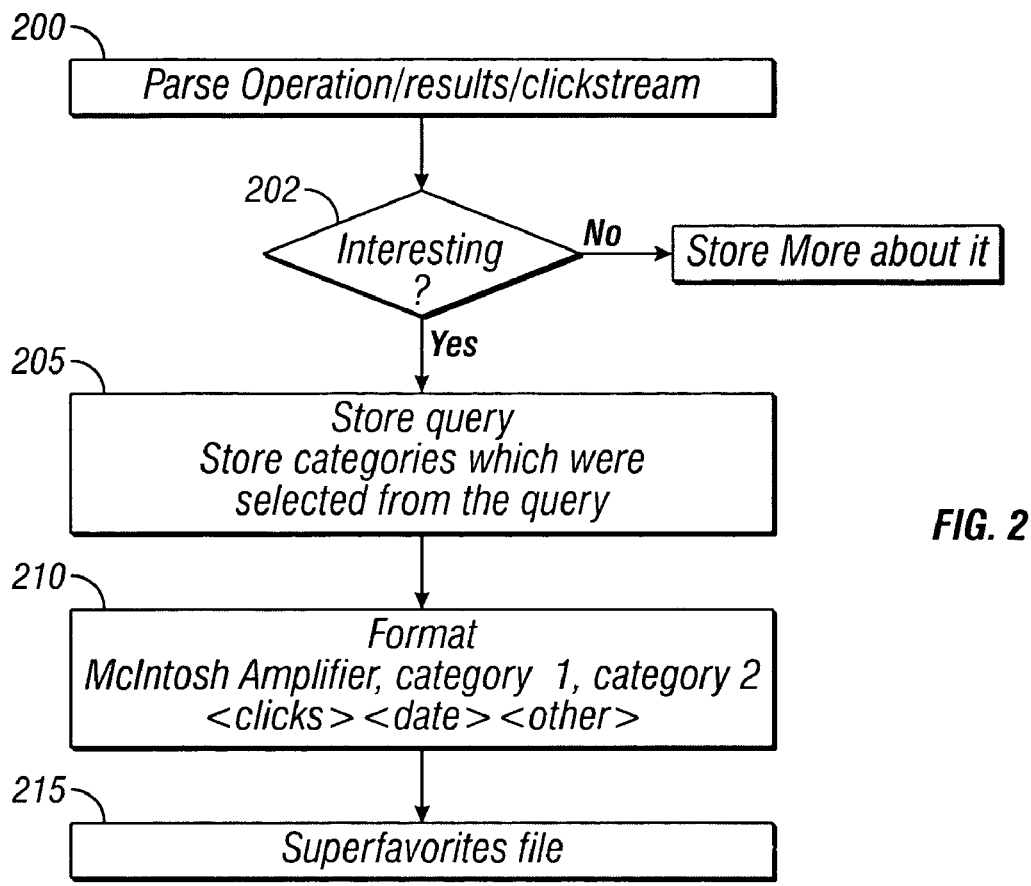
FIG. 2 shows a flowchart of operation of forming the super favorites file.

In the case of an auction site such as eBay, it should be recognized that the whole auction space might be too large to fit into any reasonable storage space, and/or at any reasonable and download time. FIG. 2 shows a routine that may be run in the accessing computers to automatically formed the super preferences file.

Each time the user looks for an item on server 100, the operation of looking, and its results are monitored at 200. 200 looks at the specific operation, the results obtained from that operation, and certain clickstream information. For any query, the results may be either interesting to the user or not interesting to the user. 200 attempts to determine whether the results were interesting to the user or not, based on the user's actions once obtaining those results.

For example, assuming that the user is looking for an audio amplifier that was made by the Company Mcintosh in the 1960s. The user may be at any of the computers which can access the Internet. The user enters the query "Mcintosh amplifier". This may return a number of results, some of which are interesting, others of which are uninteresting. The user selects some of these results and views them. The action of selection, and viewing, and the amount of time that the user views the results, is monitored at 200. 202 represents determining whether the user has found these results to the interesting. This may use standard clickstream monitoring techniques. For example, the amount of time that the user has the page opened and active may be monitor. If the user goes for 30 seconds without interacting with the page by mouse or other movement, then it is assumed the user has left the computer. However, assuming any action is present within any 30 second window, it is assumed that the time that the window is open is active time. If the user finds a window to be interesting, by monitoring that window for more than sixty seconds, or by selecting any content from that window, then the contents of the window are labeled as interesting at 202. In contrast, if the user views and immediately closes the window for example in less than 30 seconds, then the contents of the window are found to the uninteresting at 202, and no information about that window may be stored.

If the results of monitoring indicates that the results were interesting, then more information about the query and/or results are stored at 205. Therefore, the information about the obtained results may be automatically obtained at 205. This may include the query which produced the result, the categories which were selected from that query, and other categories within that result.

The information about the interesting content may be stored in the form shown as 210, e.g. the name of the query, its category, other information about the query, clickstream information such as time or a weighted value indicating how long the window was opened, and a date. The date code may be important for reasons described herein, since the preferences file is frequently updated to indicate the user's changing perceptions and needs. Other information may also be stored as part of 210. For example, the entire text at each screen that is selected may be stored. Information from images on the screen may also be stored, using visual database techniques. Neural nets and other artificial intelligence may provide the other information for processing at 210. More processing power and more storage may allow more information about the interesting categories to be stored. Each interesting selection is stored as a separate entry in the super favorites file 215.

The result of this operation is that each of the computers shown in FIG. 1, and conceivably any other computer with which the user might interact, may store its own super favorites file.

Figure 3:
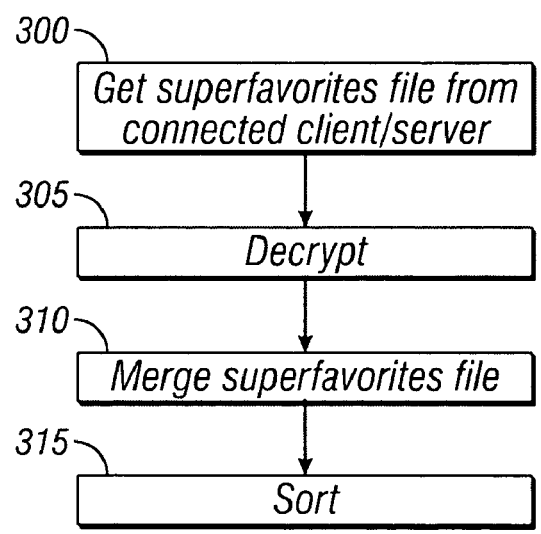
FIG. 3 shows a flowchart of obtaining more information from the super favorites file and merging it with existing information.
Figure 4:
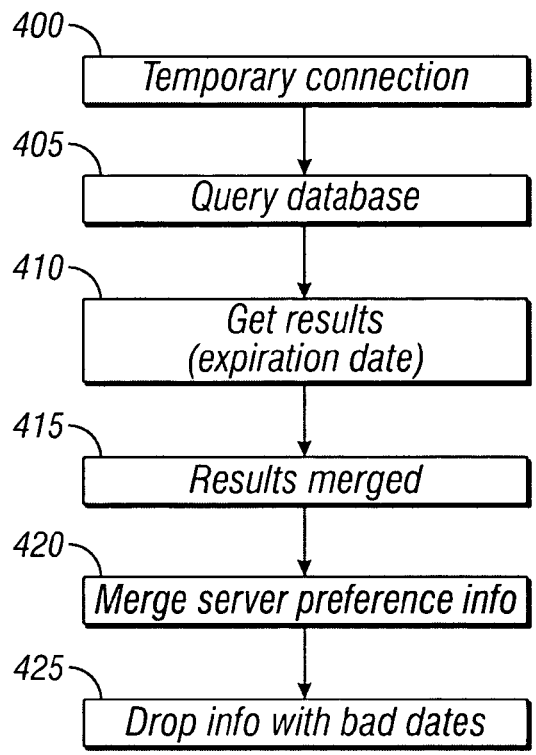
FIG. 4 shows a flowchart of operation of merging.
Figure 5:
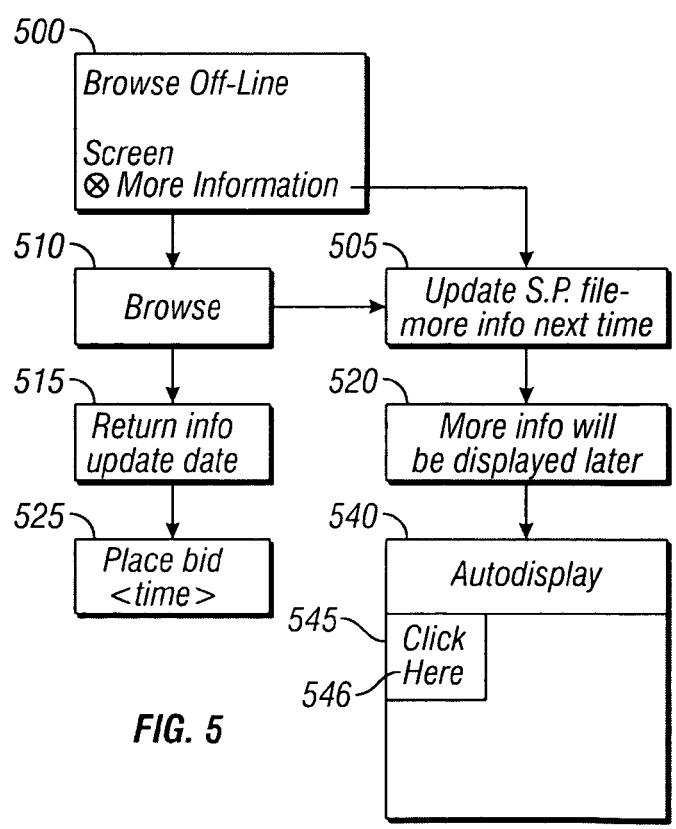
FIG. 5 shows a chart of a browsing operation.

The off-line client 130 may connect to any of the other computers in the FIG. 1 block diagram. The connection between the off-line client 130 and either of the computers 110 or 120 may be via a synchronization process e.g. by a hot sync connection. The connection to the server may be via a dial-up or as a hot sync connection through the temporary computer 142. During each connection, the routine shown in FIG. 3 may be carried out.

At 300, the connection receives the super favorites file from the connected client or server. The operation of receiving this super favorites file requires that the off-line client 130 identify itself to the connecting client/server. Each super favorites file is preferably stored in an encrypted form, or otherwise protected against download or other unwanted access. For example, the off-line client 130 may store a private key that is used to decrypt the super favorites file of any of the local computers. The local computers each store the public key for the user, and therefore can encrypt the super favorites file using that private key information. Each entry to the super favorites file can be individually encrypted as it is produced, for example. Alternatively, each session can be encrypted. Since the super favorites file is formed of separate entries, each of which is simply data, the computers such as 120 and 100 do not need to include decryption capability.

Any case, at 300, the super favorites file is obtained from the connected client/server. The contents of the super favorites file may be decrypted at 305. The decrypted contents are then merged with the other previously-obtained and locally obtained content at 310. At 315, the new super favorites file is sorted. The sorting may be used to assign weights to different characteristics, to remove values which are out of date, and to place the information in a specified order.

Now, to prepare for a later browse off-line, the off-line client 130 makes a temporary connection to the Internet shown as 140. This may be via one of the computers such as 120, or may be a direct dial-up connection to the Internet. The temporary connection is shown being made at 400. During the temporary connection, the off-line client 130 scours the entire database within the server 100. A number of queries are made at 405, preferably one query for each entry in the super favorites file. At 410, the results are received from the database. Each result may also be dated, e.g. with an expiration date at 415. The results are merged with the existing information in the off-line client's existing database. For example, when the results are obtained at 410, these may only be results that have been entered since the last query. The results are merged by removing any results in the database that have an expired expiration date, updating existing results in the database with new information about those existing results, and forming a new file. In addition, any of the preference information that is stored on the server about the user may be returned and merged with the super preferences file at 420.

The result is a large database of off-line information based on the users super favorites.

At 425, the information with expired dates is dropped from the database.

At 500, the off-line client may be accessed to browse off-line. 500 may present a screen which simulates the actual screen that would be seen if the user were online. Depending on the size of the storage available, this may include an image of the item, a reduced quality image of the item, or no image of the item. On any of these screens, when the information has been removed for purposes of reduction of the amount of stored information, a special icon indicative of request for more information is also displayed. By selecting the more information icon, the super preferences file is updated to indicate that during the next Internet connection, more information should be obtained.

The user may browse at 510 as though they were connected to the Internet. This may include making the queries, and asking for more information about items. When the off-line database includes information about the items, it is returned at 515. At this time, the information which met the criteria that returned a good result is also updated with the new date so that this kind of information stays current. When the off-line database does not include information about the items, then the super favorites file is again updated at 505 to indicate that information of this type should be returned next time. A special screen indicating that more information will be obtained later, is then displayed at 520.

The user may also interact with the information at 525. In the case of the eBay interaction, the user may place a bid on the item at 525. The bid is marked with the actual time at which it was placed. This may be important, since in certain cases, the earliest bid will win when there is a tie between two bid prices. The bid is actually presented at the next hot sync. In the case of another Internet server, the user may actually place an order for an item, and be presented with an off-line agent that secures the user's payment information. Payment authorization is then obtained at the next hot sync.

Also in the case of a timed system, such as eBay, the time to the end of the auction may be timed relative to a clock on the offline client. This may provide the user with real time information about the bid or other offline content. The times on the off-line client may therefore be correct, although the bid amounts may be out of date since the last hot sync.

As described above, this may be used with other clients besides eBay type auction clients. It may operate on the user's home computer or laptop, to store certain broadband offline content. When used on the home computer, the server may actually offload some of the storage to the user's home computer. This operation may be done in the background to provide off line access to certain Internet pages.

For example, if a user with a relatively slow connection wants to access broadband content in real time, parts of that broadband content may be downloaded to the user's computer in the background and stored in a cache. The content is part of the user's preference information.

An example, a user might be interested in viewing movie trailers over the Internet. Based on the preferences, a user may background download the five most common movie trailers and keep them in the user's computer on the hard drive. Later, if the user selects one of those movie trailers for viewing, at least part of the viewing is carried out based on the off-line content.

After a synchronization operation, certain information will be automatically displayed to the user. For example, each time the screen 520, indicating that more information will be displayed later, gets displayed, the results may be automatically displayed after the sync at 540. As an alternative to the automatic display, the system may display a screen such as shown in 545 which has a portion 546 indicating that the user should "click here for messages" and previously-requested items. The messages and previously requested items can include more information on the previously-requested items, and may also include, for example, results of bids e.g. failed bids and outbid notices. The system may also return other kinds of messages.

Although only a few embodiments have been disclosed in detail above, other modifications are possible. All such modifications are intended to be encompassed within the following claims, in which:

What is claimed is:

1. A method, comprising:

automatically monitoring a user's actions when connected to the Internet; and forming a preferences file based on said user's actions when connected to the Internet including an amount of time that the user has spent on specified Internet sites, and using said preferences file including said amount of time that the user has spent on said specified sites to obtain off-line content to be used when the user is not connected to the Internet, wherein said automatically monitoring comprises monitoring the users actions in a first computer that has a connection to the Internet, and producing a file of said users actions in said first computer, and said using said preferences file comprises using said preferences file in a second computer to obtain content for a time when said second computer does not have a connection to the Internet.

2. A method as in claim 1, wherein said automatically monitoring comprises monitoring the users actions in a first computer at a first time and forming a preferences file based on said actions at said first time, and subsequently monitoring the users actions in a second computer at a second time, and using said actions at said second time to add content to said preferences file.

3. A method as in claim 1, wherein said forming a preferences file comprises encrypting said preferences file, and said using comprises decrypting said preferences file.

4. A method as in claim 1, wherein said preferences file includes a plurality of entries, each entry representing an action taken by a user when connected to the Internet.

5. A method as in claim 1, wherein said automatically monitoring comprises monitoring the same users actions on a plurality of different computers, and using all of said actions on all of said plurality of different computers to form said preferences file and obtain off-line content.

6. A method as in claim 5, wherein said using comprises merging information from said plurality of different computers.

7. A method as in claim 1, further comprising forming a file indicative of said users actions and an indication of when said users actions occurred, and wherein said obtain off-line content comprises obtaining off-line content only when said action occurred within a specified time of a time when said off-line content is being obtained.

8. A method as in claim 1, wherein said users action comprises browsing an Internet merchants site, and said preferences file indicates content to be obtained from said merchants site.

9. A method as in claim 1, wherein said preferences file includes an indication of an users interest in specified content.

10. A method as in claim 9, wherein said indication of interest in said specified content is based on an amount of time that the user viewed said specified content.

11. An apparatus, comprising:

a server, providing information which can be viewed over a network;

a first computer, connected to said network, and viewing said information over said network, said computer producing a record of information that is viewed over said network; and another computer, which may be temporarily connected to said network, said another computer forming a preferences file based on said record of information that is viewed over said network, and obtaining off line content based on said preferences file, wherein said producing a record of information comprises monitoring the user's actions in said first computer that has a connection to the Internet, and producing a file of said user's actions in said first computer, and said obtaining offline content in said another computer comprises using said preferences file in said another computer to obtain content for a time when said another computer does not have a connection to the Internet.

12. An apparatus as in claim 11, further comprising a second computer, connected to said network, and producing a record of information that is viewed over said network, and wherein said another computer forms said preferences file based on records of information from both said first computer and from said second computer.

13. An apparatus as in claim 11, wherein said first computer includes an encryption process, encrypting said record of information.

14. An apparatus as in claim 13, wherein said another computer includes a decryption process, decrypting said record of information.

15. An apparatus as in claim 11, wherein said first computer monitors a users viewing of information over the network, by monitoring clickstream of the user.

16. A method, comprising:

accessing the Internet from a first computer and automatically forming information in said first computer about said accessing;

protecting said information in said first computer against access by an unauthorized source; and using said information in said first computer to produce a preferences file to be used to obtain information to be viewed off-line, wherein said automatically forming comprises monitoring the users actions in the first computer that has the connection to the Internet, and producing a file of said users actions in said first computer, and said using said information comprises using said preferences file in a second computer to obtain content for a time when said second computer does not have a connection to the Internet.

17. A method as in claim 16, wherein said protecting comprises encrypting said information.

18. A method as in claim 17, further comprising accessing the Internet from a second computer, and automatically forming second information in said second computer, wherein said preferences file is obtained based on both said first information from said first computer and said second information from said second computer.

* * * * *